United States Patent [19]
Wittenberg

[11] 3,948,529
[45] Apr. 6, 1976

[54] PHONOGRAPH TURNTABLE ANTI-SKATING DEVICE

[75] Inventor: Roland C. Wittenberg, New Hyde Park, N.Y.

[73] Assignee: Pickering & Company, Inc., Plainview, Long Island, N.Y.

[22] Filed: Aug. 20, 1975

[21] Appl. No.: 606,068

[52] U.S. Cl. ............................................. 274/23 R
[51] Int. Cl.² ......................................... G11B 3/10
[58] Field of Search ................................. 274/23 R

[56] References Cited
UNITED STATES PATENTS

| | | | |
|---|---|---|---|
| 2,647,753 | 8/1953 | Goldmark | 274/23 R |
| 3,319,967 | 5/1967 | Zimmermann | 274/23 R |
| 3,380,744 | 4/1968 | Ohnishi et al. | 274/23 R |
| 3,722,893 | 3/1973 | Shimoda | 274/23 R |

FOREIGN PATENTS OR APPLICATIONS

| | | | |
|---|---|---|---|
| 1,192,041 | 5/1970 | United Kingdom | 274/23 R |

Primary Examiner—Houston S. Bell, Jr.
Assistant Examiner—Steven L. Stephan
Attorney, Agent, or Firm—Kane, Dalsimer, Kane, Sullivan and Kurucz

[57] ABSTRACT

An anti-skating device is provided for a phonograph turntable of the type including a base, a post extending longitudinally from the base and a tone arm supported for rotational movement about the post. The device comprises an elongated weight disposed about the post, means extending between the weight and tone arm connecting the two whereby the tone arm rotates with the weight, and means for applying a torque to the weight tending to rotate the weight about the longitudinal axis of the post to thereby apply a torque to the tone arm counter to the skating torque of the tone arm.

2 Claims, 2 Drawing Figures

PHONOGRAPH TURNTABLE ANTI-SKATING DEVICE

BACKGROUND OF THE INVENTION

The present invention relates to phonograph turntables and more particularly to a device for use with phonograph turntables to prevent skating of the turntable tone arm.

In most turntables, as a result of the angle between the line tangent to the record grooves and a line connecting the stylus tip to the tone arm pivot point, a skating force is developed that tends to force the tone arm towards the center of the record. This skating force is proportional to the above described angle, the tracking force applied to the stylus and the coefficient of friction between the stylus and the record groove. Since the angle is constant for a given turntable and the coefficient of friction is approximately constant for a given stylus, the skating force is then equal to some constant multiplied by the tracking force applied to the stylus.

As mentioned above, this skating force tends to drive the arm inwardly towards the center of the record or in other words, it produces a skating torque about the tone arm pivot point. For all standard record players wherein a record rotates in the clockwise direction, the skating force developed is also a clockwise torque around the tone arm horizontal pivot point. The purpose of the anti-skating device is to develop an antiskating force (or torque) to balance out this skating torque.

A number of anti-skating devices have been used in turntables that are now on the market. The most common of these consists of small weights secured to the tone arm that serve to produce torques via attached strings and wires. A problem with these existing devices is that the adjustment of the skating force is limited to discrete steps because of the use of fixed weights and notches for the string at different discrete radii. Other anti-skating devices available use springs and/or magnets to develop an anti-skating torque.

In view of the above, it is the principal object of the present invention to provide an improved anti-skating device adjustable over a continuous range to provide an anti-skating force.

SUMMARY OF THE INVENTION

The above and other beneficial objects and advantages are attained in accordance with the present invention by providing an anti-skating device for a phonograph turntable of the type including a base, a post extending longitudinally from the base and a tone arm supported for rotational movement about the post. The device comprises an elongated weight disposed about the post, means extending between the weight and tone arm connecting the two whereby the tone arm rotates with the weight, and means for applying a torque to the weight tending to rotate the weight about the longitudinal axis of the post to thereby apply a torque to the tone arm counter to the skating torque of the tone arm.

DETAILED DESCRIPTION OF THE PREFERRED EMBODIMENT

Figure 1:
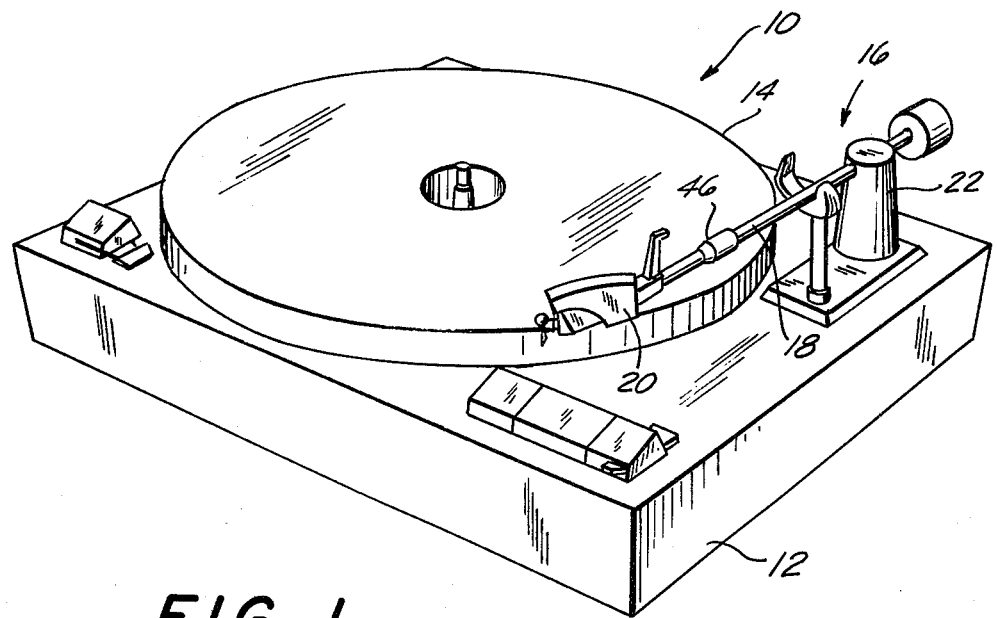
FIG. 1 is a perspective view of a phonograph turntable incorporating the anti-skate device of the present invention; and, FIG. 2 is a simplified diagrammatic view of the phonograph anti-skate device.

Reference is now made to the drawings wherein the present invention is illustrated. In FIG. 1 a turntable 10 is disclosed comprising a base 12 containing therein a motor and the associated electronics to drive a record supporting disc 14. A tone arm assembly 16 extends upwardly from the base. Assembly 16 includes a pivotally mounted tone arm 18 containing a cartridge 20 at one end. The anti-skating mechanism of the present invention includes portions of the tone arm support and is contained within a covering shroud 22 extending upwardly from the turntable base.

Figure 2:
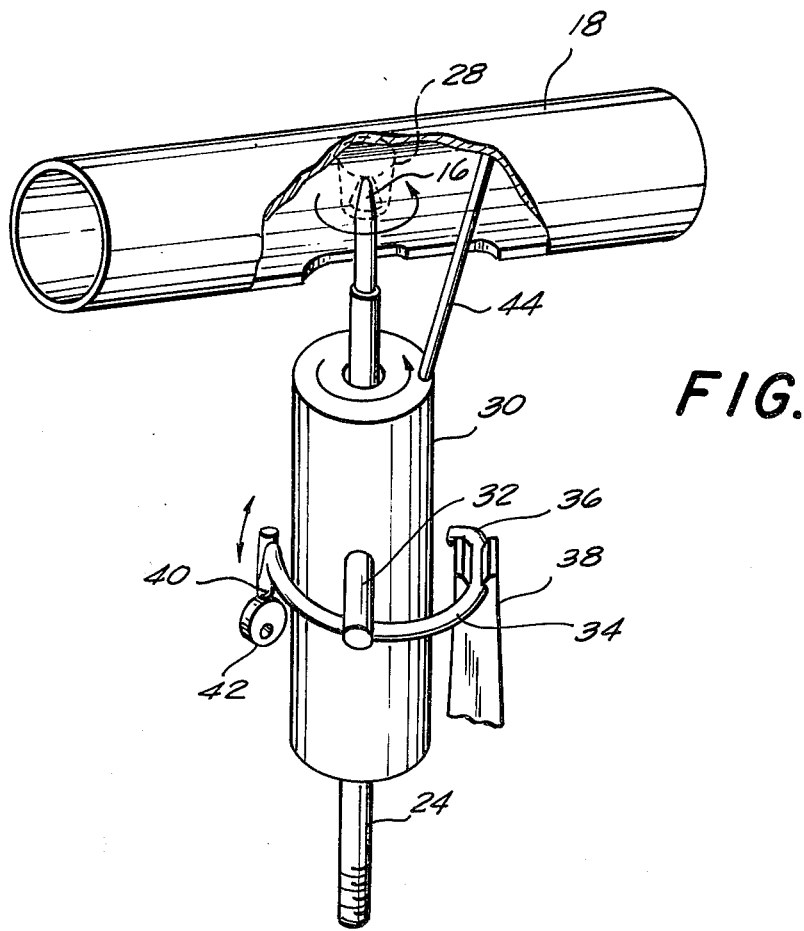

The details of the present anti-skating device are shown in FIG. 2. Referring to FIG. 2, it can be seen that a post 24 extends upwardly from the turntable base. The top end 26 of the post is pointed and engages a conical opening in a support bushing 28 mounted to the tone arm 18. The post and bushing serve to provide a pivotal support for the tone arm permitting free, rotational movement of the tone arm about the post as well as some limited vertical movement.

A cylindrical weight 30 is positioned about post 24. A substantially horizontal pin 32 extends outwardly from the weight. The pin is supported near its free end on a support ring 34 which, in turn, has one end 36 hingedly mounted to a post 38 to permit vertical movement of the other end 40, as shown. In this connection, the end 40 rides on a cam 42 so that by rotation of cam 42 the angle support ring 34 makes with the horizontal may be varied.

A rod 44 extends between the top surface of weight 30 and the tone arm connecting the two so that the weight rotates with the tone arm. It can thus be seen that when the plane of support ring 34 is horizontal no torque is transmitted through rod 44 to the tone arm. However, when the plane of the support ring 34 is inclined at some angle with the horizontal, the slider pin 32 tends to slide down the ring 34 thereby tending to rotate the weight in the manner indicated by the arrow in FIG. 2. As a result, a counterclockwise torque is transmitted through rod 44 to the tone arm. This torque is counter to the skating torque on the tone arm. By thus varying the angle that ring 34 makes with the horizontal, the counterclockwise torque transmitted to the tone arm can be adjusted to compensate for the skating torque.

The above relationship may be stated algebraically by the following:

$$T_A = W \tan \theta_R \times R_P$$

WHERE:
 $T_A$ = counterclockwise torque (or anti-skating torque)
 $W$ = weight of the weighted cylinder
 $\theta_R$ = angle between an inclined plane through ring and the horizontal plane
 $R_P$ = distance between center of the pivot post and the point of contact between pin 32 and ring 34

From the above equation it can be seen that the amount of anti-skating torque developed is directly proportional to the angle of support ring 34 since all other factors are constant for a given design. Since this angle is controlled by a cam 42 that moves the end 40 of the ring vertically, the position of the cam can be calibrated in terms of the required anti-skating torque necessary to balance the skating force developed for a given tracking force. The tracking force, in turn, is controlled by a weight 46 mounted about the tone arm.

Thus, in accordance with the above, the aforementioned objects are effectively attained.

1. In a phonograph of the type including a generally horizontal base, a post extending longitudinally from said base, and a tone arm supported for rotational movement about said post the improvement comprising: an elongated weight disposed adjacent said post, means extending between said weight and tone arm, and means for applying a torque to said weight consisting of, a pin secured to and extending transversely from said weight, pin support means pivotally affixed to said base for rotation about an axis transverse to said post longitudinal axis and defining a support surface on which said pin rests, and means for varying the angle which said pin support surface makes with respect to the base.

2. The invention in accordance with claim 1 wherein said weight comprises a cylindrical member disposed about said post; said support means comprises an elongated member having a first end, a second end, and an arcuate portion between said ends, said arcuate portion extending at least partially about said cylinder and thereby defining said support surface; said angle varying means comprises a cam supported to said base and engaging said member first end to move said member first end vertically in response to movement of said cam; and said pin rests on said arcuate portion.

* * * * *